(12) United States Patent
Hasegawa et al.

(10) Patent No.: US 7,978,401 B2
(45) Date of Patent: Jul. 12, 2011

(54) DELAY DEMODULATION DEVICES

(75) Inventors: Junichi Hasegawa, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 81 days.

(21) Appl. No.: 12/415,407

(22) Filed: Mar. 31, 2009

(65) Prior Publication Data

US 2010/0046064 A1    Feb. 25, 2010

(30) Foreign Application Priority Data

Mar. 31, 2008  (JP) ................................. 2008-089495

(51) Int. Cl.
  *H04B 10/06* (2006.01)
  *G02F 2/00* (2006.01)
(52) U.S. Cl. ............................. 359/325; 385/14; 398/214
(58) Field of Classification Search .......... 359/326–332; 398/161, 188, 214
  See application file for complete search history.

(56) References Cited

U.S. PATENT DOCUMENTS

| | | | | |
|---|---|---|---|---|
| 6,961,492 B2 * | 11/2005 | Doerr | ............. | 385/39 |
| 2006/0056845 A1 * | 3/2006 | Parsons et al. | .............. | 398/41 |
| 2007/0177151 A1 * | 8/2007 | Isomura et al. | ............. | 356/477 |

FOREIGN PATENT DOCUMENTS

| | | |
|---|---|---|
| JP | 6-18735 | 1/1994 |
| JP | 2003-90925 | 3/2003 |
| JP | 2007-60442 | 3/2007 |
| JP | 2007-151026 | 6/2007 |
| JP | 2007-201939 | 8/2007 |
| JP | 2007-232944 | 9/2007 |

OTHER PUBLICATIONS

U.S. Appl. No. 12/412,932, filed Mar. 27, 2009, Hasegawa, et al.
Hiroshi Takahasi, et al., "PLC Technology-based Modulator and Demodulator for DQPSK", NTT Technical Journal, vol. 19, No. 11, Nov. 2007, pp. 52-57 (with partial English translation).
Christopher R. Doerr, et al., "Monolithic Demodulator for 40-Gb/s DQPSK Using a Star Coupler", Journal of Lightwave Technology, vol. 24, No. 1, Jan. 2006, pp. 171-174.

* cited by examiner

Primary Examiner — Hemang Sanghavi
(74) Attorney, Agent, or Firm — Oblon, Spivak, McClelland, Maier & Neustadt, L.L.P.

(57) ABSTRACT

The delay demodulation device 1 comprises: an input waveguide 2 which receives DQPSK signals; a Y-branch waveguide 3 which splits the input waveguide 2; a first Mach-Zehnder interferometer 4; and a second Mach-Zehnder interferometer 5. Both end of two arm-waveguides 8, 9 of the first Mach-Zehnder interferometer 4 and both ends of two arm-waveguides 12, 13 of the second Mach-Zehnder interferometer 5 are angled toward the center portion of a planar lightwave circuit (PLC) 1A. Because of the angle, the length of the two arm-waveguides 8, 9 of the first Mach-Zehnder interferometer 4 and the length of the two arm-waveguides 12, 13 of the second Mach-Zehnder interferometer 5 in Z-direction can be shortened, and input couplers 6,10 and output couplers 7,11 of each Mach-Zehnder interferometers in Z-direction can be shortened as well. The area occupied by each Mach-Zehnder interferometers 4, 5 are also reduced.

7 Claims, 3 Drawing Sheets

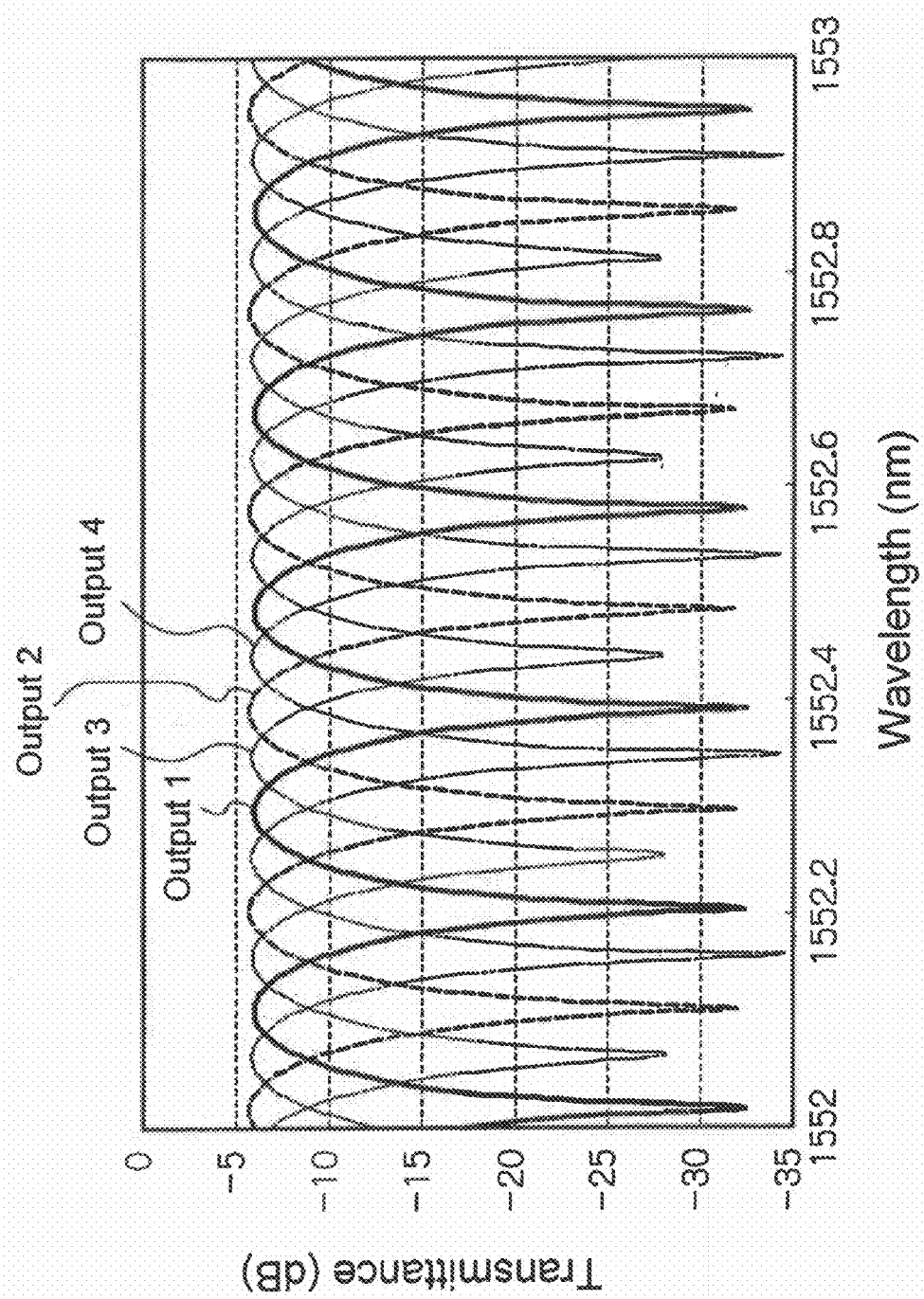

DELAY DEMODULATION DEVICES

TECHNICAL FIELD

The present invention relates to a delay demodulation device used for optical fiber communications, and particularly, relates to a delay demodulation device equipped with PLC type-Mach-Zehnder interferometers, which demodulate DQPSK signals in Dense Wavelength Division Multiplexing (DWDM) transmission systems.

RELATED ARTS

Recently, with the rapid growth in broadband networks, high speed optical transmission systems (toward transmission rate of 40 Gbps) have been investigated actively. However, when the transmission rate is increased, the time duration per 1 bit of optical signal is reduced and, because of the characteristics of an optical fiber, signal waveforms are deteriorated, and therefore the quality of a communication line is deteriorated. For 40 Gbps-class Long-haul transmission systems, transponders that transform an optical signal to an electrical signal and then transform the electrical signal back to an optical signal are needed in the transmission path. Therefore, it is difficult to make a high speed optical transmission system using existing optical fiber networks.

Because of this issue, research and development has been done in Differential Quadrature Phase Shift Keying (DQPSK), which is able to reduce deterioration of signal waveforms by increasing the time duration per bit of optical signals.

DQPSK is the phase shift keying method to transmit four informations corresponding to four different light phases. In other words, DQPSK transmits four data (0, 1, 2, 3) of each symbol, which comprises two bits of data, by changing light phases ($\theta$, $\theta+\pi/2$, $\theta+\pi$ or $\theta+3\pi/2$) of a carrier wave in accordance with the change of data between the adjacent symbols. 40 Gbps DQPSK transmission systems can transmit four times longer distance than conventional 40 Gbps transmission systems. Because of DQPSK, it is believed that construction of networks between large cities can be achieved using existing optical fiber networks.

For example, a conventional delay demodulation device which demodulates DQPSK signals or DPSK signals in a receiving device, are disclosed in Japanese Patent Publication document 1, and in Japanese Patent Publication document 2.

An optical receiving circuit disclosed in Japanese Patent Publication 2007-60442 (document 1) is equipped with Mach-Zehnder interferometers, which propagate return-to-zero (RZ) modulated DPSK signals through a pair of optical paths, which are equipped with a one-symbol delay element in one of the pair optical paths.

Also, a demodulation device disclosed in Japanese Patent Publication 2007-151026 (document 2) uses Michelson interferometers to demodulate DPSK or DQPSK optical signals.

When delay detection is performed in 40 Gbps DQPSK transmission systems, a PLC-type delay circuit (a delay demodulation device) which includes two PLC-type Mach-Zehnder interferometer (MZI) circuits and demodulates DQPSK signals are used. In the 40 Gbps DQPSK transmission systems, the permissible value of Polarization Dependent frequency (PDf) in the delay circuit is said to be less than 0.2 GHz. As a way to reduce PDf, a half wave plate can be inserted in the Mach-Zehnder interferometers. However, in the way of just inserting the half wave plate, it is difficult to lower the Polarization Dependent frequency (PDf) to be less than 0.2 GHz and causes a low yield ratio. Therefore, it is very difficult to fabricate a delay demodulation circuit with small Polarization Dependent frequency (<0.2 GHz) consistently. Also, reduction in size of the module containing the delay demodulation device and reduction in power consumption of the module are also desired.

BRIEF SUMMARY OF THE INVENTION

The present invention seeks to overcome the above-identified problems. The purpose of the present invention is to provide a delay demodulation device with reduced Polarization Dependent frequency and reduced chip size.

To solve the above issue, a delay demodulation device with a planar lightwave circuit for demodulating DQPSK signals according to the present invention as claimed in 1 comprises: an input waveguide, which receives the DQPSK signals; a Y-branch waveguide, which splits the input waveguide; a first Mach-Zehnder interferometer comprising: an input coupler, which is connected to one of the two waveguides split by the Y-branch waveguide; an output coupler, which is connected to output waveguides; and two arm-waveguides which have different lengths and are connected between the input coupler and the output coupler, and a second Mach-Zehnder interferometer comprising: an input coupler, which is connected to the other of the two waveguides split by the Y-branch waveguide; an output coupler, which is connected to output waveguides; and two arm-waveguides which have different lengths and are connected between the input coupler and the output coupler, wherein the first Mach-Zehnder interferometer and the second Mach-Zehnder interferometer are formed to overlap each other in the same areas.

According to the construction, whole planar lightwave circuit can be made smaller. Particularly, because the area including the two arm-waveguides of the first and second Mach-Zehnder interferometers becomes smaller, a planar lightwave circuit chip can be made smaller.

Because reduction in size of a planar lightwave circuit chip is performed, uniformity of the temperature distribution in the surface of a planar lightwave circuit (PLC) can be improved and the shift of center wavelength due to environment and temperature fluctuation can be very small. Also, because reduction in size of a planar lightwave circuit chip is performed, stress distribution within the chip, which causes birefringence, is reduced, and the shift of center wavelength due to the environment and temperature fluctuation can be made very small. Therefore, the delay demodulation device with little or no wavelength shift due to the environment and temperature fluctuation and small initial polarization dependent frequency PDf can be obtained. Furthermore, because the chip is reduced in size, a module using the delay demodulation device can be smaller, and the power consumption of the module can be reduced as well.

In a delay demodulation device according to the present invention as claimed in 2, the two arm-waveguides of the first Mach-Zehnder interferometer and the two arm-waveguides of the second Mach-Zehnder interferometer are formed in the same areas such that the two arm-waveguides of the first Mach-Zehnder interferometer and the two arm-waveguides of the second Mach-Zehnder interferometer cross each other. According to the construction, it becomes able to obtain the chip which is reduced in size and in polarization dependent frequency Pdf.

In a delay demodulation device according to the present invention as claimed in 3, the first Mach-Zehnder interferometer and the second Mach-Zehnder interferometer are formed bilaterally symmetric to each other on a planar lightwave circuit base plate. According to the construction, the chip can be further reduced in size and in polarization dependent frequency Pdf.

In a delay demodulation device according to the present invention as claimed in 4, a half-wave plate is inserted at the center portion of the two arm-waveguides of the first Mach-Zehnder interferometer and at the center portion of the two arm-waveguides of the second Mach-Zehnder interferometer. According to the construction, the PLC chip can be reduced in polarization dependent frequency Pdf.

In a delay demodulation device according to the present invention as claimed in 5, the center portion of the two arm-waveguides of the first Mach-Zehnder interferometer are extended in parallel and close to each other, and the center portion of the two arm-waveguides of the second Mach-Zehnder interferometer are extended in parallel and close to each other. According to the construction, retardation of the half wave plate can be suppressed.

In a delay demodulation device according to the present invention as claimed in 6, two ends of the output waveguides connected to the output coupler of the first Mach-Zehnder interferometer and two ends of the output waveguides connected to the output coupler of the second Mach-Zehnder interferometer are formed in the same end facet of a planar lightwave circuit chip. According to the construction, whole planar lightwave circuit can be made smaller and the chip can be further reduced in size.

In a delay demodulation device according to the present invention as claimed in 7, the planar lightwave circuit chip is approximately in square planar shape.

In a delay demodulation device according to the present invention as claimed, at least one heater is formed on at least one of the two arm-waveguides of the first Mach-Zehnder interferometer, and at least one heater is formed on at least one of the two arm-waveguides of the second Mach-Zehnder interferometer.

According to the construction, polarization dependent frequency PDf can be adjusted by driving any one of the heaters of the first or the second Mach-Zehnder interferometer. After the adjustment, a phase control (a phase trimming) can be performed by driving any one of the heaters of the two Mach-Zehnder interferometers to adjust the phase difference between the two Mach-Zehnder interferometers $\pi/2$.

According to the present invention, it becomes able to provide a delay demodulation device in which chip is reduced in size and polarization dependent frequency is reduced.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which;

FIG. 5 is a graph showing a spectrum of the delay demodulation device.

DETAILED DESCRIPTION OF THE INVENTION

Detailed description as follows;

A delay demodulation device according to one embodiment of the present invention, will be described in detail based on FIGS. 1-5.

Figure 1:
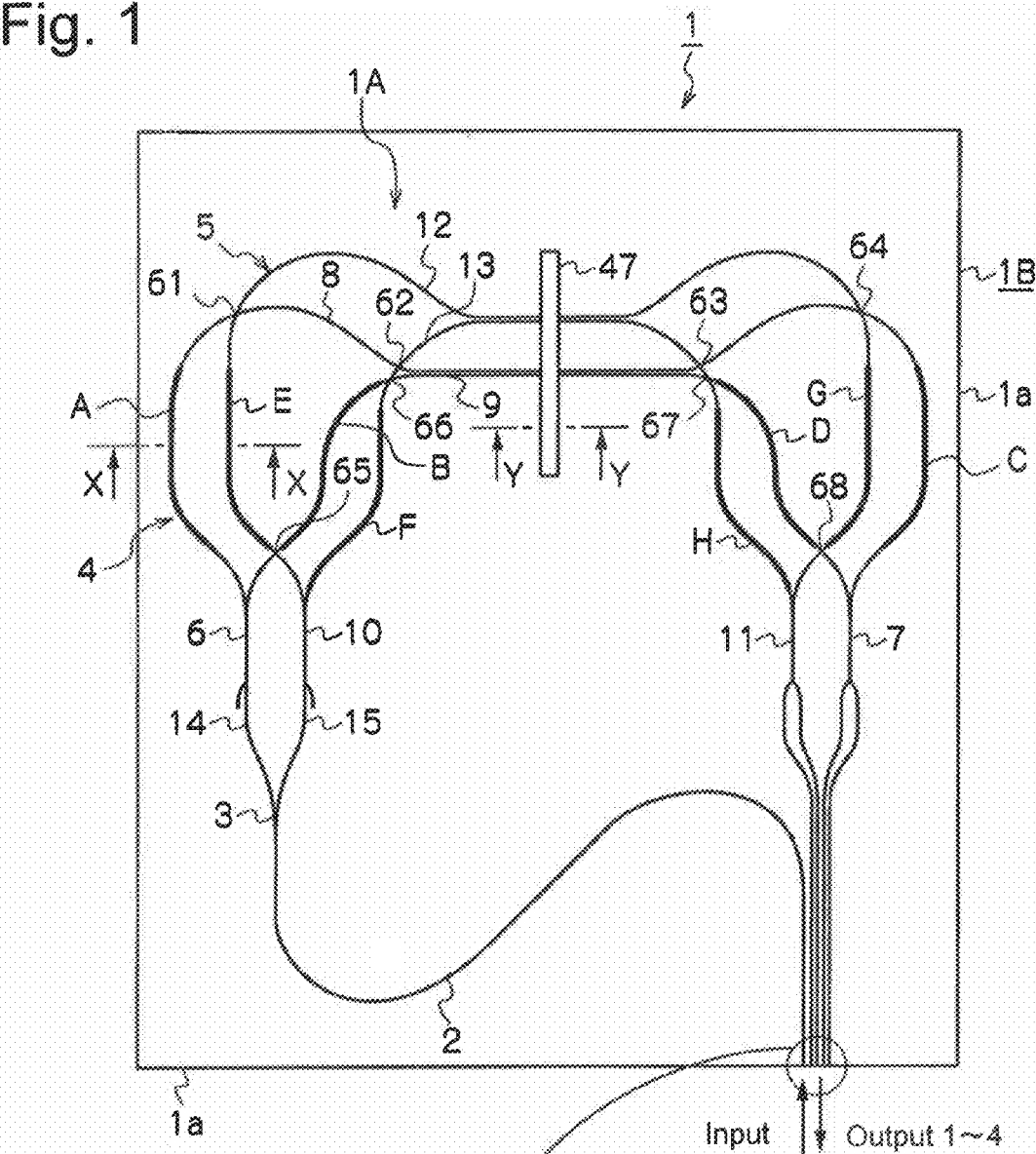
FIG. 1 is a plan view showing a schematic configuration of a delay demodulation device according to one embodiment.
Figure 1:
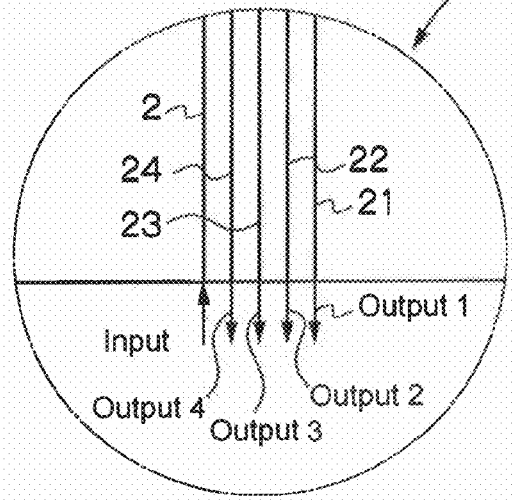
Figure 2:
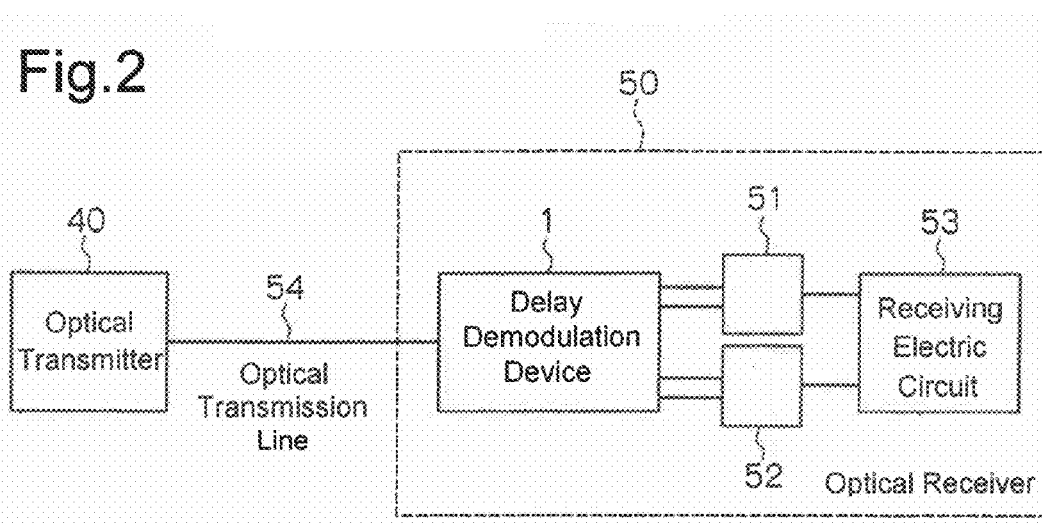
FIG. 2 is a block diagram showing a schematic configuration of an optical transmission system using a DQPSK method.
Figure 3:
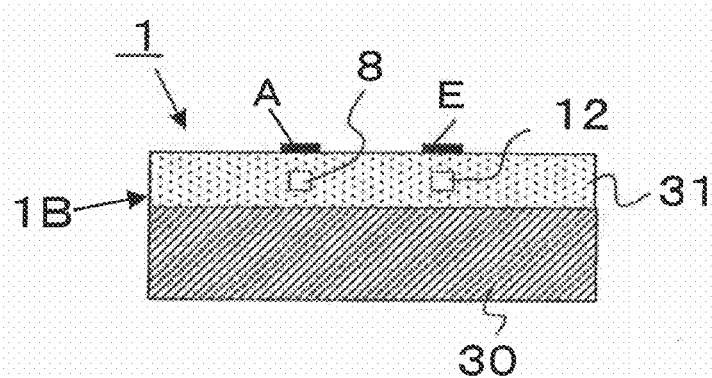
FIG. 3 is a cross-sectional view along line X-X in FIG. 1.
Figure 4:
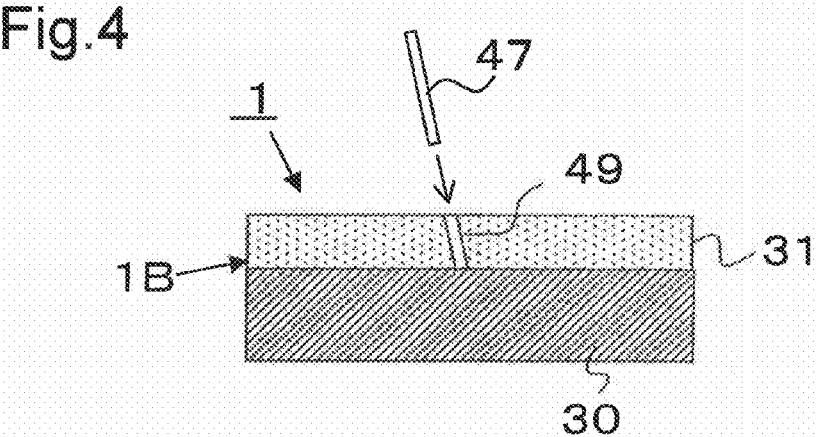
FIG. 4 is a cross-sectional view along line Y-Y in FIG. 1.

FIG. 1 is a plan view showing a schematic configuration of a delay demodulation device according to one embodiment, FIG. 2 is a block diagram showing a schematic configuration of an optical transmission system using DQPSK method. FIG. 3 is a cross-sectional view along line X-X in FIG. 1, FIG. 4 is a cross-sectional view along line Y-Y in FIG. 1. FIG. 5 is a graph showing a spectrum of the delay demodulation device.

A Delay demodulation device 1 shown in FIG. 1 is a planar lightwave circuit (PLC)-type delay demodulation device which demodulates DQPSK signals. The delay demodulation device 1 is, for example, a 40 Gbps DQPSK delay demodulation device used in an optical transmission system shown in FIG. 2, using a DQPSK method in which the transmission rate is 40 Gbps.

In the optical transmission system, DQPSK signals are transmitted from an optical transmitter 40 to an optical fiber transmission line 54. DQPSK signals are signals in which four data (0, 1, 2 or 3) of each symbol comprising two bits of data are modulated to light phases ($\theta$, $\theta+\pi/2$, $\theta+\pi$ or $\theta+3\pi/2$) of a carrier wave in accordance with the change of data between the adjacent symbols. DQPSK signals which are transmitted from the optical fiber transmission line 54 to an optical receiver 50 are converted to four optical intensity signals by the delay demodulation device 1, and furthermore, the optical intensity signals are converted to electric signals by balanced receivers 51 and 52. In a receiving electric circuit 53, various processes such as decryption process are performed.

The delay demodulation device 1 shown in FIG. 1 comprises an input waveguide 2, which receives DQPSK signals; a Y-shape waveguide 3, which splits the input waveguide 2; a first Mach-Zehnder interferometer 4; and a second Mach-Zehnder interferometer 5.

The first Mach-Zehnder interferometer 4 comprises: an input coupler 6 connected to one (waveguide 14) of the two waveguides 14, 15 which are split by the Y-branch waveguide 3; an output coupler 7 connected to output ends of two output waveguides 21, 22; and two arm-waveguides 8, 9 which are connected between the both couplers 6, 7 have different lengths. Similarly, the second Mach-Zehnder interferometer 5 comprises: an input coupler 10 connected to the other (waveguide 15) of the two waveguides 14, 15, which are split by the Y-branch waveguide 3; an output coupler 11 connected to output ends of two output waveguides 23, 24; and two arm-waveguides 12, 13 which are connected between the both couplers 10, 11 and have different lengths.

The input couplers 6, 10 and the output couplers 7, 11 are 2 input×2 output-type, 3 dB couplers (50% directional couplers). One of the two input ends of the input coupler 6 of the first Mach-Zehnder interferometer 4 is connected to the one waveguide 14 of the two waveguides 14, 15 split by the Y-branch waveguide 3. And one of the two input ends of the input coupler 10 of the second Mach-Zehnder interferometer 5 is connected to the other waveguide 15 of the two waveguide 14, 15 split by the Y-branch waveguide 3.

Also, the two output ends (a through port and a cross port) of the output coupler 7 of the first Mach-Zehnder interferometer 4 are connected to the first and second output waveguides 21, 22, respectively. In a similar fashion, the two output ends (a through port and a cross port) of the output coupler 11 of the second Mach-Zehnder interferometer 5 are connected to the third and fourth output waveguides 23, 24, respectively.

Also, between the two arm-waveguides 8, 9 of the first Mach-Zehnder interferometer 4, there is a difference ΔL in optical path length to delay the phase of the DQPSK signals propagating in one arm-waveguide (arm-waveguide 8) by π, with respect to the DQPSK signals propagating in the other arm-waveguide (arm-waveguide 9). In a similar fashion, between the two arm-waveguides 12, 13 of the second Mach-Zehnder interferometer 5, there is a difference ΔL in optical path length to delay the phase of the DQPSK signals in one arm-waveguide (arm-waveguide 12) by π, with respect to the DQPSK signals propagating in the other arm-waveguide (arm-waveguide 13).

Characteristics of the delay demodulation device 1 according to the present embodiment, resides in that the two arm-waveguides 8, 9 of the first Mach-Zehnder interferometer 4 and the two arm-waveguides 12, 13 of the second Mach-Zehnder interferometer 5 are formed to overlap each other in the same areas, within the planar lightwave circuit (PLC) 1A.

In the present embodiment, as one example of the way of overlapping, the arm-waveguides 8, 9 and the arm-waveguides 12, 13 are formed in the same areas of the planar lightwave circuit (PLC) 1A such that the arm-waveguides 8, 9 and the arm-waveguides 12, 13 cross each other four times.

In other words, as shown in FIG. 1, the arm-waveguide 8 of the first Mach-Zehnder interferometer 4 crosses with the arm-waveguide 12 of the second Mach-Zehnder interferometer 5 at a crossover point 61, with the arm-waveguide 13 of the second Mach-Zehnder interferometer 5 at a crossover point 62, with the arm-waveguide 13 at a crossover point 63, and with the arm-waveguide 12 at a crossover point 64, respectively.

The arm-waveguide 9 of the first Mach-Zehnder interferometer 4 crosses with the arm-waveguide 12 of the second Mach-Zehnder interferometer 5 at a crossover point 65, with the arm-waveguide 13 of the second Mach-Zehnder interferometer 5 at a crossover point 66, with the arm-waveguide 13 at a crossover point 67, and with the arm-waveguide 12 at a crossover point 68, respectively.

In a similar fashion, the arm-waveguide 12 of the second Mach-Zehnder interferometer 5 crosses with the arm-waveguide 9 of the first Mach-Zehnder interferometer 5 at the crossover point 65, with the arm-waveguide 8 of the first Mach-Zehnder interferometer 5 at the crossover point 61, with the arm-waveguide 8 at the crossover point 64, and with the arm-waveguide 9 at the crossover point 68, respectively.

And, the arm-waveguide 13 of the second Mach-Zehnder interferometer 5 crosses with the arm-waveguide 9 of the first Mach-Zehnder interferometer 5 at the crossover point 66, with the arm-waveguide 8 of the first Mach-Zehnder interferometer 4 at the crossover point 62, with the arm-waveguide 8 at the crossover point 63, and with the arm-waveguide 9 at the crossover point 67, respectively In each of the crossover point 61-68, two arm-waveguides cross each other, and lights (optical signals) propagating the two arm-waveguides pass through the crossover point and then propagate in the same arm-waveguides as before passing through the crossover point. For example, at the crossover point 61, two arm-waveguides 8, 12 cross each other, and lights (optical signals) propagating the two arm-waveguides 8, 12 pass through the crossover point 61 and then propagate in the same arm-waveguides 8, 12 as before passing through the crossover point 61.

The planar lightwave circuit 1A shown in FIG. 1 is a circuit which includes the input waveguide 2, the Y-branch waveguide 3, the first Mach-Zehnder interferometer 4, the second Mach-Zehnder interferometer 5, and the four output waveguides 21-24, respectively made from silicate glasses. The delay demodulation device 1 comprising the planar lightwave circuit 1A is manufactured as follow.

With flame hydrolysis deposition (FHD) method, silica material ($SiO_2$-type glass particles), which becomes a lower cladding layer and a core layer, is deposited on a PLC base plate 30 as shown in FIG. 3, and then, the silica material. is fused and made transparent by adding heat. Then, desired waveguides are formed by photolithography and reactive ion etching, and a upper cladding layer is formed with FHD method. In FIG. 3, a cladding layer 31 comprising the lower cladding layer and the upper cladding layer is formed on the PLC base plate 30, and the arm-waveguides 8, 9 are formed as the core layer inside of the cladding layer 31. The PLC base plate 30 is approximately made in a square planar shape as shown in FIG. 1.

In the delay demodulation devices 1 according to the present embodiment, the first Mach-Zehnder interferometer 4 and the second Mach-Zehnder interferometer 5 are formed bilaterally symmetric to each other on the PLC base plate 30.

Also, in the delay demodulation devices 1, to reduce polarization dependent frequency PDf, a half wave plate 47 is inserted at the center portion of the two arm-waveguides 8, 9 of the first Mach-Zehnder interferometer 4 and at the center portion of the two arm-waveguides 12, 13 of the second Mach-Zehnder interferometer 5. As shown in FIG. 4, a groove 49 in which the half wave plate 47 is inserted, is formed in the cladding layer 31. The groove 49 is tilted by 8° to make the half-wave plate 47 tilt by 8° as shown in FIG. 4, to prevent loss due to reflections by the half-wave plate 47.

Also, in the delay demodulation device 1, as shown in FIG. 1, the center portion of the two arm-waveguides 8, 9 of the first Mach-Zehnder interferometer 4 are extended in parallel to and close to each other, and the center portion of the two arm-waveguides 12, 13 of the second Mach-Zehnder interferometer 5 are also extended in parallel to and close to each other.

The other characteristics of the delay demodulation device 1 are as follows. As shown in FIG. 1, the end of the input waveguide 2, the ends of the two output waveguides 21, 22, and the ends of the other two output waveguides 23, 24 are formed in the same end facet 1a of the PLC chip (planar lightwave circuit chip) 1B, which is approximately square planar in shape. In other words, the end of the waveguides 2 and the ends of the four output waveguides 21~24 are disposed to be close to each other in the same end facet 1a which is one of four sides of the PLC chip 1B.

Also, in the delay demodulation device 1, heaters are formed on the two arm-waveguides 8, 9 of the first Mach-Zehnder interferometer 4 and the two arm-waveguides 12, 13 of the second Mach-Zehnder interferometer 5.

In the present embodiment, as one example, heaters A, C are formed on the both sides of the center portion of the arm-waveguide 8; and heaters B, D are formed on the both sides of the center portion of the arm-waveguide 9. In a similar way, heaters E, G are formed on the both sides of the center portion of the arm-waveguide 12, and heaters F, H are formed on the both sides of the center portion of the arm-waveguide 13. Heaters A~H are formed above the corresponding arm-waveguide and are Tantalum-type thin film heaters formed onto the upper cladding (the cladding layer 31 in FIG. 3) by sputtering. In FIG. 3, the heaters A, E formed above the cladding layer 31 of the arm-waveguides 8, 12 are shown.

Also, in the delay demodulation device 1, the output ends of output waveguides 21, 22 are output ports (a first output port and a second output port) which output signals 1, 2 (see FIG. 5) wherein the phase of one output signal is shifted by $\pi$ with respect to the other. In a similar way, the output ends of output waveguides 23, 24 are output ports (a third output port and a fourth output port) which output signals 3 and 4 (see FIG. 5) wherein the phase of one output signal is shifted by $\pi$ radians with respect to the other.

In the delay demodulation device 1, DQPSK signals transmitted from the optical fiber transmission line 54 to the optical receiver 50 are split by the Y-branch waveguide 3, and in the first Mach-Zehnder interferometer 4, the split DQPSK signals propagate to the two arm-waveguides 8, 9 which have different lengths. The Mach-Zehnder interferometer 4 shifts the phase of the DQPSK signal transmitted in one arm-waveguide 8 by one symbol ($\pi$) with respect to the phase of the signal in the other arm-waveguide 9. Similarly, the second Mach-Zehnder interferometer 5 shifts the phase of the DQPSK signal transmitted in one arm-waveguide 12 by one symbol ($\pi$) with respect to the phase of the signal in the other arm-waveguide 13.

The delay demodulation device 1 adjusts polarization dependent frequency PDf, for example, by driving the heaters A, C or the heaters B, D of the Mach-Zehnder interferometer 4. After the adjustment, phase control (phase trimming) is performed to shift the phase of one Mach-Zehnder interferometer by $\pi/2$ to the phase of the other Mach-Zehnder interferometer, for example, by driving the heaters A and C.

Embodiment

A delay demodulation device 1 for 40 Gbps DQPSK is fabricated, by forming a planar lightwave circuit (PLC) 1A which includes an input waveguide 2; a Y-branch waveguide 3; Mach-Zehnder interferometers 4, 5; and output waveguides 21~24 on a silicon base plate 30 shown in FIG. 3, by using FHD method, photolithography and reactive ion etching.

In the fabricated delay demodulation device 1, in the case of which the difference in the refractive index difference between the cladding layer and the core layer (fractional refractive index difference $\Delta$) is 1.5%, and the size of the circuit (size of the PLC chip 1B) is 19 mm×16 mm and reduction in size is performed. Its FSR is set to 20 GHz. Polarization dependent frequency PDf is adjusted by driving heaters on one of the two Mach-Zehnder interferometers 4, 5. After the adjustment, phase control (phase trimming) is performed by driving heaters on one of the two Mach-Zehnder interferometers 4, 5 to shift the phases of one Mach-Zehnder interferometer by $\pi/2$ with respect to the phase of the other Mach-Zehnder interferometer.

A fiber array having five optical fibers in a line is connected to the facet 1a of the PLC chip 1B, in which the end of the input waveguide 2 and the ends (output ports) of output waveguides 21-24 outputting optical signals are formed, and a packaging is performed. Also, as a temperature control device, a Peltier element and a thermostat are used. Then, a module having the delay demodulation device 1 is fabricated.

FIG. 5 shows the results of the optical characteristics of the 40 Gbps DQPSK delay demodulation device 1 (PLC-type delay demodulation device for DQPSK). Insertion loss of less than 6 dB and extremely low PDf of less than 0.1 GHz are obtained.

According to the embodiment presented above, the following advantages can be obtained.

In the delay demodulation device 1, the two arm-waveguides 8, 9 of the first Mach-Zehnder interferometer 4, and the two arm-waveguides 12, 13 of the second Mach-Zehnder interferometer 5 are overlapped in the same areas within the planar lightwave circuit (PLC) 1A. More specifically, the arm-waveguides 8, 9 and the arm-waveguides 12, 13 are formed in the same areas of the planar lightwave circuit (PLC) 1A such that the arm-waveguides 8, 9 and the arm-waveguides 12, 13 cross each other four times. Because of such construction, the planar lightwave circuit 1A can be made smaller. In particular, because areas including the two arm-waveguides 8, 9 of the first Mach-Zehnder interferometer 4 and two arm-waveguides 12, 13 of the second Mach-Zehnder interferometer 5 become smaller, the PLC chip (chip) 1B can be made smaller as well.

Because reduction in size of the PLC chip 1B is performed, uniformity of the temperature distribution in the surface of a planar lightwave circuit (PLC) 1A can be improved and the shift of center wavelength due to environment and temperature fluctuation can be made very small.

Also, because reduction in size of the PLC chip 1B is performed, stress distribution within the PLC chip 1B, which causes birefringence, is reduced, and the shift of center wavelength due to the environment and temperature fluctuation can be made very small. Therefore, the delay demodulation device with little or no wavelength shift due to the environment and temperature fluctuation and small initial polarization dependent frequency PDf can be obtained.

Because the PLC chip 1B is reduced in size, a module using the delay demodulation device can be smaller, and the power consumption of the module can be reduced as well.

Because the arm-waveguides 8, 9 and the arm-waveguides 12, 13 are formed within the same area of the planar lightwave circuit (PLC) 1A such that the arm-waveguides 8, 9 and the arm-waveguides 12, 13 cross each other four times, the PLC chip 1B can be made smaller and polarization dependent frequency Pdf can be reduced.

Because the first Mach-Zehnder interferometer 4 and the second Mach-Zehnder interferometer 5 are formed bilaterally symmetric to each other on the PLC base plate 30, the PLC chip 1B can be further reduced in size and in polarization dependent frequency Pdf.

Because the half wave plate 47 is inserted at the center portion of the two arm-waveguides 8, 9 of the first Mach-Zehnder interferometer 4 and at the center portion of the two arm-waveguides 12, 13 of the second Mach-Zehnder interferometer 5 of the delay demodulation device 1, polarization dependent frequency PDf can be reduced.

The center portions of the two arm-waveguides 8, 9 of the first Mach-Zehnder interferometer 4 are extended in parallel and close to each other. The center portions of the two arm-waveguides 12, 13 of the second Mach-Zehnder interferometer 5 are extended in parallel and close to each other. Because of the construction, retardation of the half wave plate 47 can be suppressed.

Because the end of the input waveguide 2 and the ends of four output waveguides 21~24 are formed in the same end facet 1a of the PLC chip 1B, the PLC chip 1B can be further reduced in size.

Because the heaters A~H are formed on the two arm-waveguides of the first and second Mach-Zehnder interferometers 4, 5, polarization dependent frequency PDf can be adjusted by driving any one of the heaters of either the first or the second Mach-Zehnder interferometers 4, 5. After the adjustment, a phase control (a phase trimming) can be performed by driving any one of the heaters of the two Mach-Zehnder interferometers 4, 5 to adjust the phase difference between the two Mach-Zehnder interferometers 4, 5 to $\pi/2$.

In the above embodiment, because the arm-waveguides 8, 9 and the arm-waveguides 12, 13 cross each other four times, there are some transmission losses at crossover points 61~68. However, the total transmission loss is about 0.1~0.2 dB and relatively small.

Also, in the above embodiment, the arm-waveguides 8, 9 and the arm-waveguides 12, 13 cross each other four times. However, the present invention can be applied to a delay demodulation device, in which the arm-waveguides 8, 9 and the arm-waveguides 12, 13 cross each other twice.

Also, in the above embodiment, as a preferred embodiment, the center portions of the two arm-waveguides 8, 9 of the first Mach-Zehnder interferometer 4, and the two arm-waveguides 12, 13 of the second Mach-Zehnder interferometer 5 are formed adjacent to each other. However, the present invention is not limited to such construction of the embodiment. The present invention can be applied to a delay demodulation device, in which the center portions of two arm-waveguides of a first Mach-Zehnder interferometer and the center portions of two arm-waveguides of a second Mach-Zehnder interferometer can be formed apart from and in parallel to each other.

The present invention is not limited to the above described embodiments and various and modifications may be possible without departing from the scope of the present invention.

What is claimed is:

1. A Planar Lightwave Circuit (PLC) delay demodulation device comprising:
    a PLC base plate;
    an input waveguide, which receives DQPSK signals;
    a Y-shape waveguide, which splits the input waveguide into two waveguides;
    a first Mach-Zehnder interferometer including a first input coupler, which is connected to one of the two waveguides split by the Y-shape waveguide, a first output coupler, which is connected to output waveguides, and two arm-waveguides having different lengths with respect to each other and connected between the first input coupler and the first output coupler; and
    a second Mach-Zehnder interferometer including a second input coupler, which is connected to another waveguide split by the Y-shape waveguide, a second output coupler, which is connected to other output waveguides, and two arm-waveguides having different lengths with respect to each other and connected between the second input coupler and the second output coupler,
    wherein the first Mach-Zehnder interferometer and the second Mach-Zehnder interferometer are disposed bilaterally symmetric to each other on the PLC base plate,
    each of the two arm-waveguides of the first Mach-Zehnder interferometer crosses each of the two arm-waveguides of the second Mach-Zehnder interferometer once on each side of the PLC base plate, and
    the two arm-waveguides of the first Mach-Zehnder interferometer and the two arm-waveguides of the second Mach-Zehnder interferometer cross each other four times.

2. The delay demodulation device of claim 1, wherein a half-wave plate is inserted at a center portion of the first set of two arm-waveguides of the first Mach-Zehnder interferometer and at a center portion of the second set of two arm-waveguides of the second Mach-Zehnder interferometer.

3. The delay demodulation device of claim 2, wherein the center portion of the first set of two arm-waveguides of the first Mach-Zehnder interferometer are parallel and close to each other, and the center portion of the second set of two arm-waveguides of the second Mach-Zehnder interferometer are parallel and close to each other.

4. The delay demodulation device of claim 1, wherein two individual ends of the output waveguides connected to the first output coupler of the first Mach-Zehnder interferometer and two individual ends of the other output waveguides connected to the second output coupler of the second Mach-Zehnder interferometer are placed on a same side of the PLC base plate.

5. The delay demodulation device of claim 4, wherein the PLC base plate is approximately in square planar shape.

6. The delay demodulation device of claim 1, further comprising:
    a heater disposed on at least one of the two arm-waveguides of the first Mach-Zehnder interferometer; and
    another heater disposed on at least one of the two arm-waveguides of the second Mach-Zehnder interferometer.

7. The delay demodulation device of claim 2, wherein the center portion of the first set of two arm-waveguides of the first Mach-Zehnder interferometer are parallel to each other, and the center portion of the second set of two arm-waveguides of the second Mach-Zehnder interferometer are parallel to each other.

* * * * *